United States Patent
Mobin et al.

(10) Patent No.: US 9,917,709 B2
(45) Date of Patent: Mar. 13, 2018

(54) DESERIALIZER DC OFFSET ADAPTATION BASED ON DECISION FEEDBACK EQUALIZER ADAPTATION

(71) Applicant: Avago Technologies General IP (Singapore) Pte. Ltd., SG (SG)

(72) Inventors: Mohammad Mobin, Allentown, PA (US); Haitao Xia, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/233,750

(22) Filed: Aug. 10, 2016

(65) Prior Publication Data

US 2018/0048494 A1 Feb. 15, 2018

(51) Int. Cl.
*H04L 25/03* (2006.01)
*H04L 25/06* (2006.01)

(52) U.S. Cl.
CPC .. *H04L 25/03057* (2013.01); *H04L 25/03885* (2013.01); *H04L 25/06* (2013.01)

(58) Field of Classification Search
CPC ........... H04L 25/03006; H04L 25/0296; H04L 25/061; H04L 25/08; H04L 25/03057; H04L 25/06; H04L 25/03885

See application file for complete search history.

(56) References Cited

U.S. PATENT DOCUMENTS

| | | | |
|---|---|---|---|
| 7,409,019 B2 | 8/2008 | Hsu et al. | |
| 7,812,749 B2 | 10/2010 | Abel et al. | |
| 8,270,464 B2 * | 9/2012 | Hidaka | H04L 25/03057 375/233 |
| 8,457,190 B2 | 6/2013 | Raghavan et al. | |
| 2004/0013083 A1 * | 1/2004 | Sobchak | H04L 25/03133 370/203 |
| 2005/0058234 A1 * | 3/2005 | Stojanovic | H04L 7/0334 375/371 |
| 2010/0219996 A1 * | 9/2010 | Abel | H04L 25/061 341/120 |
| 2014/0072079 A1 | 3/2014 | Matsumoto et al. | |

* cited by examiner

*Primary Examiner* — Vineeta Panwalkar
(74) *Attorney, Agent, or Firm* — Sheridan Ross P.C.

(57) ABSTRACT

An apparatus for processing data includes a decision feedback equalizer configured to sample an analog signal to yield digital data and a DC offset adaptation circuit. The decision feedback equalizer is configured to sample the equalized signal using at least one data latch at a first data latch threshold value and at a second data latch threshold value. The DC off set adaptation circuit is configured to calculate a DC off set in the analog signal based on the first data latch threshold value and on the second data latch threshold value.

20 Claims, 8 Drawing Sheets

DESERIALIZER DC OFFSET ADAPTATION BASED ON DECISION FEEDBACK EQUALIZER ADAPTATION

FIELD OF THE INVENTION

Various embodiments of the present invention provide for DC Offset adaptation in a serializer/deserializer (SerDes) receiver based on decision level adaptation in a decision feedback equalizer in the SerDes receiver.

BACKGROUND

Serializer and Deserializer (SerDes) circuits facilitate the transmission of data across a serial link, particularly in high speed digital communication systems. Data to be transmitted from a first location is serialized or converted from parallel data to serial data and is transmitted across a communications channel to a receiver at a second location. To recover the transmitted information, the receiver samples an analog waveform and must then reliably detect values of the sampled data in the process of converting back from serial data to parallel data. The receiver can have a DC offset in the signal input in its analog front end and can therefore deliver a signal with a DC offset to the input to data latches that sample the signal. Such a DC offset can cause asymmetric DC compression which distorts signal characteristics in a nonlinear fashion.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components.

DETAILED DESCRIPTION OF THE INVENTION

Embodiments of the present invention are related to adaptation of DC offset compensation in a deserializer receiver based on independent adaptation of multiple data latch threshold levels in a decision feedback equalizer in the deserializer receiver. In some embodiments, the DC offset compensation is applied upstream from a linear equalizer. In some other embodiments, the DC offset compensation is applied in the decision feedback equalizer. A SerDes receiver can have a built in DC offset from its analog front end and may deliver a DC offset signal at the input to the latches in the decision feedback equalizer or other data sampling device. These latches can include data latches, generally vertically centered within a data eye, and error latches, generally placed at the signal levels or decision levels dlevXYZ forming the data eye. The DC offset can be corrected either at the analog front end or at the input to the latches. If the DC offset is not corrected, asymmetric DC compression can occur and consequently distort the signal characteristics in a nonlinear fashion. On the other hand a lack of DC offset will reduce signal decision margin unless the top and bottom decision feedback equalizer data eyes are adapted independently.

DC offset compensation is adapted in various embodiments by adapting the top and bottom decision feedback equalizer first post cursor independent of each other to retain the receiver margin. Half the sum of the top and bottom decision feedback equalizer data eyes is fed back to the analog front end so that the input signal is balanced along the analog path. Such a decision feedback equalizer first post cursor asymmetric correction-based DC offset system guarantees continuous receiver margin retention. A follow-up DC offset feedback loop makes the signal DC-balanced so that signal linearity is maintained along the analog data path. It also ensures that the adaptation error information is balanced so that adaptation algorithms are well behaved.

Figure 1:
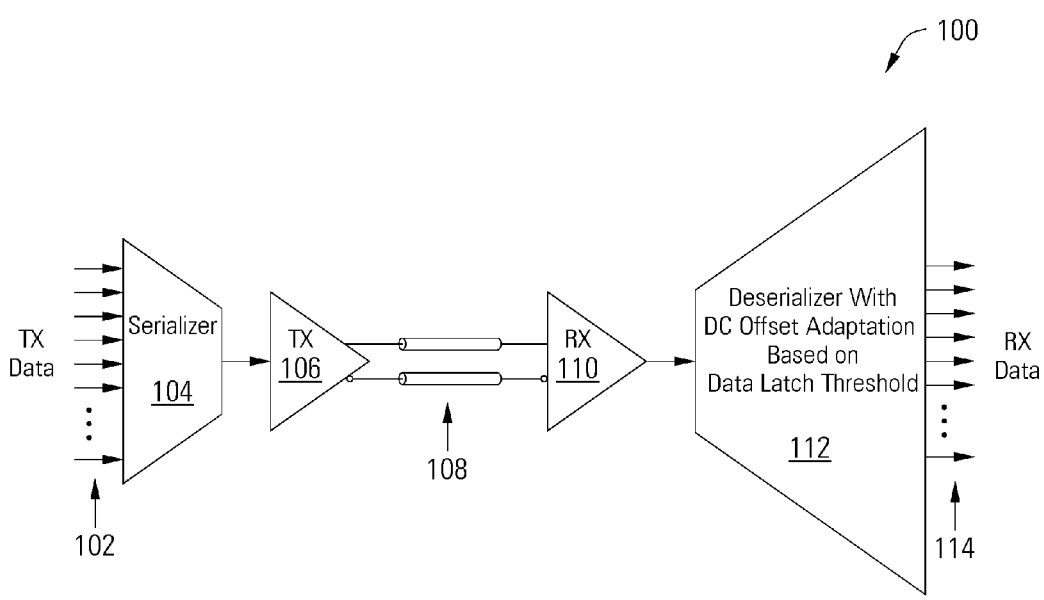
FIG. 1 depicts a Serializer/Deserializer system having a transmitter, channel and receiver, in which the deserializer receiver applies DC offset adaptation based on adaptation of decision levels in a decision feedback equalizer in the deserializer receiver in accordance with some embodiments of the present invention.

Turning to FIG. 1, a SerDes electrical link system 100 is depicted which includes a transmitter, channel and receiver. Serializer/Deserializer (SerDes) circuits facilitate the transmission of data across a serial link, particularly in high speed digital communication systems. Data to be transmitted from a first location is serialized or converted from parallel data to serial data and is transmitted across a communications channel to a receiver at a second location, or stored in a storage device and then retrieved. In some embodiments, to recover the transmitted or information, the receiver samples an analog waveform and detects the sampled data in the process of converting back from serial data to parallel data.

A serializer 104 receives parallel data 102 and serializes the data, yielding a serial output. The serializer can include any suitable circuits, such as, but not limited to, multiplexers, to convert the parallel data 102 to a serial data stream. A transmitter 106 drives the serial data across a channel 108 or to a storage device. The transmitter 106 can use any suitable driver circuits, such as voltage mode drivers, and any suitable format, such as differential signals. A receiver 110 receives the data from channel 108. A deserializer 112 converts the resulting serial data stream to parallel data 114.

The deserializer 112 compensates for DC offset in the input signal from the channel receiver 110, with the DC offset compensation adapted in the deserializer 112 based on independent adaptation of decision threshold levels in a decision feedback equalizer in the deserializer 112. In some embodiments, the decision feedback equalizer employs one or more data latches and error latches in the process of sampling the analog input signal to yield a digital output stream. In some cases, latches are reused for sampling at multiple threshold voltage levels with their threshold levels set by a multiplexer.

Figure 2:
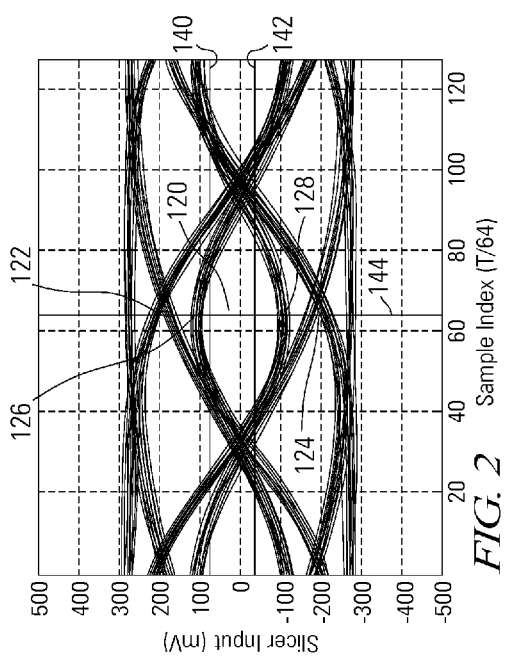
FIG. 2 depicts the data eye for a variety of three-bit data patterns in a deserializer receiver in accordance with some embodiments of the present invention.

Turning to FIG. 2, the data eye 120 for a variety of three-bit data patterns in a deserializer receiver is depicted in an eye diagram in accordance with some embodiments of the present invention. The eye diagram depicts the continuous time data signal, superimposed for various three-bit patterns. For example, the outer eye levels at points 122, 124 correspond to lower frequency data patterns '110', '001', respectively, and the inner eye levels at points 126, 128 correspond to high frequency data patterns '010' and '101', respectively, resulting in the decision thresholds dlev110 130, dlev010 132, dlev101 134 and dlev001 136 shown in FIG. 3. The threshold for error latches can be placed at the decision thresholds dlev110 130, dlev010 132, dlev101 134 and dlev001 136 during the sampling process. Based on the decision thresholds dlev110 130, dlev010 132, dlev101 134 and dlev001 136, data latch threshold levels h1p 140 and h1n 142 are calculated, representing the voltage level at which a pair of data latches are set to distinguish whether the center bit has a value of 0 or 1. (In some embodiments, a single data latch can be used by multiplexing the data latch threshold levels to alternately configure the data latch at the desired threshold.)

Figure 3:
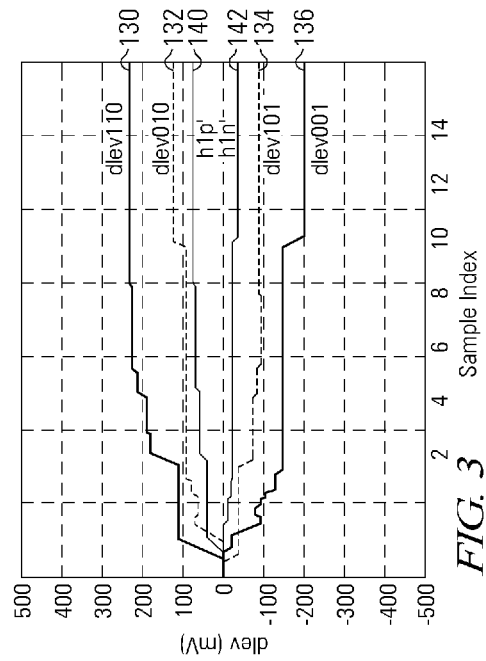
FIG. 3 depicts a plot of decision levels dlev010, dlev110, dlev001, dlev101 and data latch threshold levels h1p, h1n as they are adapted in a deserializer receiver in accordance with some embodiments of the present invention.

As shown in FIG. 3, the decision thresholds dlev110 130, dlev010 132, dlev101 134 and dlev001 136 (generally referred to as dlevXYZ thresholds) are adapted over time based on the output of error latches which are set at the dlevXYZ thresholds. For a particular data pattern (e.g., '110'), there will be some variation in the voltage of the input signal at the sampling point 144 each time the pattern is received. The error latch threshold can be adapted higher and lower until the output of the error latch is sometimes 0 and sometimes 1 for that particular data pattern, meaning that the threshold level has been set within the expected voltage variations for that pattern. In some cases, only one physical error latch is used to gather the error statistics required for adaptation. As a result the error latch voltage position is multiplexed from one voltage level to another using analog voltage multiplexing in the decision feedback equalizer at the input to the error latch, referred to herein as Error Latch Multiplexing (EMUX). The EMUX settings are rotated in some embodiments to average out data eye mismatches and static pattern sensitivities.

Figure 5:
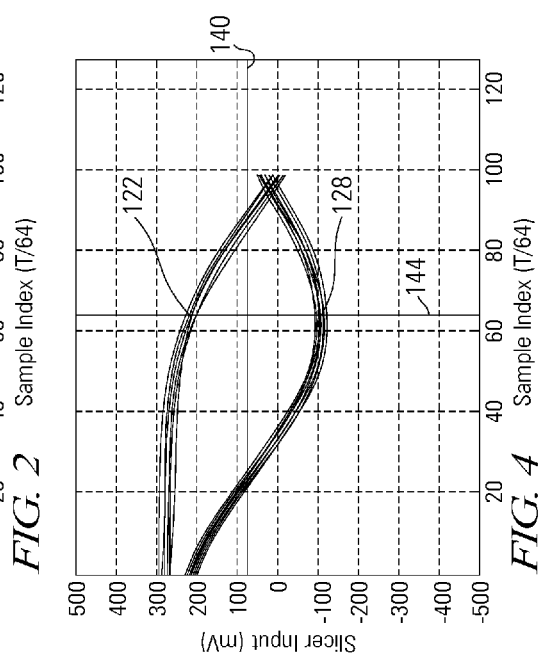
FIG. 5 depicts an example data eye for three-bit data patterns 001 and 010 and a corresponding data latch threshold level h1n in a deserializer receiver in accordance with some embodiments of the present invention.
Figure 4:
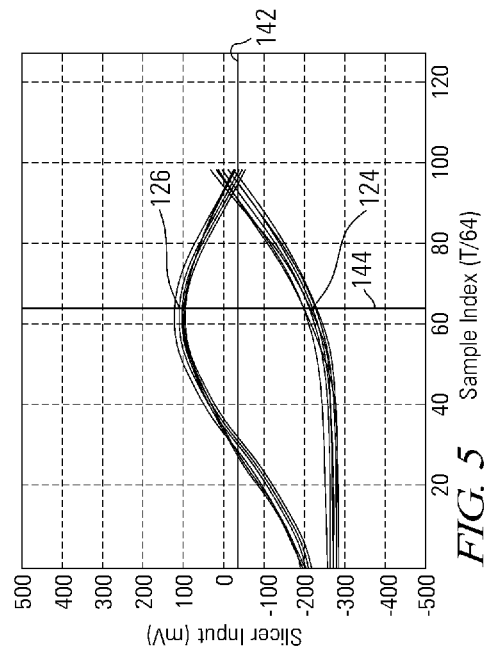
FIG. 4 depicts an example data eye for three-bit data patterns 110 and 101 and a corresponding data latch threshold level h1p in a deserializer receiver in accordance with some embodiments of the present invention.

The decision levels dlevXYZ 130, 132, 134, 136 and the data latch threshold levels h1p 140 and h1n 142 are adapted based independently for top and bottom data eyes in the decision feedback equalizer, and the DC offset compensation is adapted based on the independently adapted data latch threshold levels 140 and h1n 142, thereby preventing asymmetric DC compression while maintaining signal decision margin. For example, data latch threshold level h1p 140 is adapted based on decision levels dlev110 and dlev101 at positions 122, 128 at the sampling point 144, as shown in FIG. 4, and data latch threshold level h1n 142 is adapted based on decision levels dlev010 and dlev001 at positions 126, 124 at the sampling point 144, as shown in FIG. 5. As will be described in more detail below, the DC offset compensation is then calculated based on the data latch threshold levels h1p 140 and h1n 142.

Notably, in the example of FIGS. 2-5, the input signal includes an injected DC offset of 20 mV. The data latch threshold levels with a DC offset x included are denoted as h1p' and h1n' as in the following equations:

$$h1p'=h1p+x \quad (Eq\ 1)$$

$$h1n'=h1n+x$$

The adapted data latch threshold levels calculated based on the dlevXYZ values from the error latch output will include the DC offset and therefore correspond to h1p' and h1n' in Equation 1. Based on these values obtained in the dlevXYZ adaptation process in the decision feedback equalizer, the DC offset x can be calculated as follows:

$$DC\ offset=(h1p'+h1n')/2 \quad (Eq\ 2)$$

In the present example, if h1p'=76 mV and h1n'=−36 mV as shown in FIGS. 2-5, the DC offset is (76 mV+(−36 mV))/2=20 mV.

Figure 6:
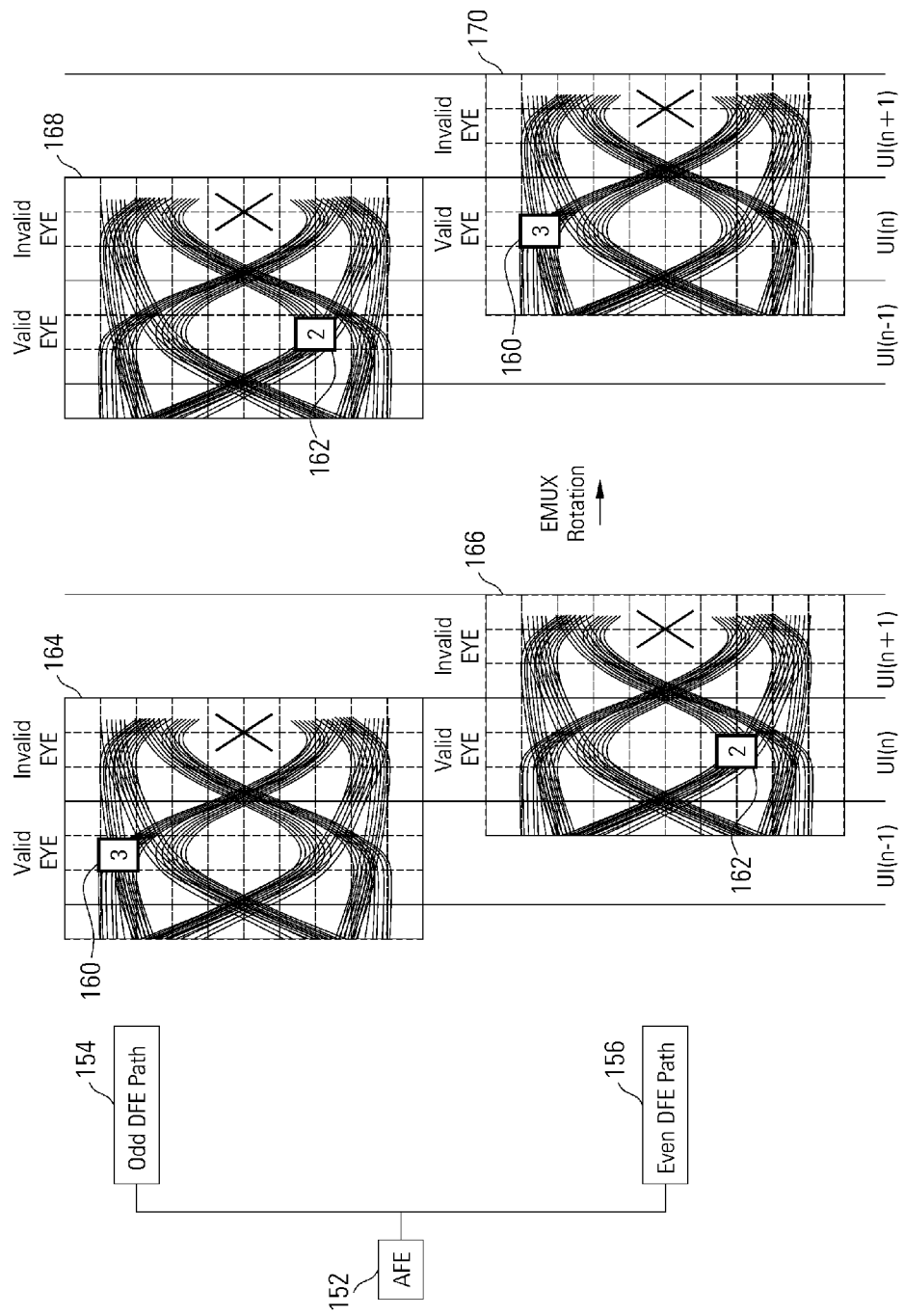
FIG. 6 depicts eye diagrams with decision levels for a pair of three-bit data patterns 110 and 101 in odd and even signal paths in a decision feedback equalizer in accordance with some embodiments of the present invention.

Turning to FIG. 6, eye diagrams are depicted with decision levels for a pair of three-bit data patterns 110 and 101 in odd and even signal paths in a decision feedback equalizer in accordance with some embodiments of the present invention. Generally, serial data is processed in an analog front end 152, such as, but not limited to, a variable gain amplifier and coupled linear equalizer, and is then sampled or sliced and can be processed in an odd path 154 and an even path 156 of a decision feedback equalizer. In a very high speed serializer/deserializer, it may not be possible to apply the desired signal processing on the fly without splitting the stream into two or more paths. By splitting the stream into at least two paths, each alternate data eye can be processed in a different path. For example, a first interval UL(n−1) can be processed in the odd data path 154, the next interval UL(n) can be processed in the even data path 156, and the next interval UL(n+1) can be processed in the odd data path 154, etc.

The decision levels (e.g., dlev110 130, dlev010 132, dlev101 134 and dlev001 136) are determined in the decision feedback equalizer and are used by a tap adaptation circuit, for example to adapt coefficients that control the gain applied by the variable gain amplifier and the boost applied by the coupled linear equalizer.

The adaptation information is gathered from error latches placed at different dlevXYZ voltage locations. In some embodiments of a decision feedback equalizer summer path there are four possible voltage levels or locations for the placement of the error latches, position 0 172 (see FIG. 7), position 1 174 (see FIG. 7), position 2 162 (see FIG. 6) and position 3 160 (see FIG. 6). In some cases, only one physical error latch is used to gather the error statistics required for adaptation. As a result the error latch voltage position is multiplexed from one voltage level to another using analog voltage multiplexing in the decision feedback equalizer at the input to the error latch, referred to herein as Error Latch Multiplexing (EMUX). Where the data stream is split into odd and even paths for alternating processing, the EMUX (xyx) position is flipped between the even and odd decision feedback equalizer summer at a pre-determined rate as programmed.

The error latch position 0 172 corresponds to the expected level with the data bits in interval Ul(n−1) and interval Ul(n) each being 0: Error latch position 0 172 {d(n−1), d(n)}={0, 0}. In other words, error latch position 0 172 corresponds to the expected voltage level for two sequential bits of value 0 in intervals UL(n−1) and UL(n). Similarly, error latch position 1 174, position 2 162 and position 3 160 correspond to bit sequences in interval UL(n−1) and interval UL(n) as follows: Error latch position 1 174 {d(n−1), d(n)}={0,1}, error latch position 2 162 {d(n−1), d(n)}={1,0}, error latch position 3 160 {d(n−1), d(n)}={1,1}. The EMUX in the decision feedback equalizer is configured to alternately multiplex the appropriate voltage levels to the error latch to set the error latch at the four possible locations.

Figure 7:
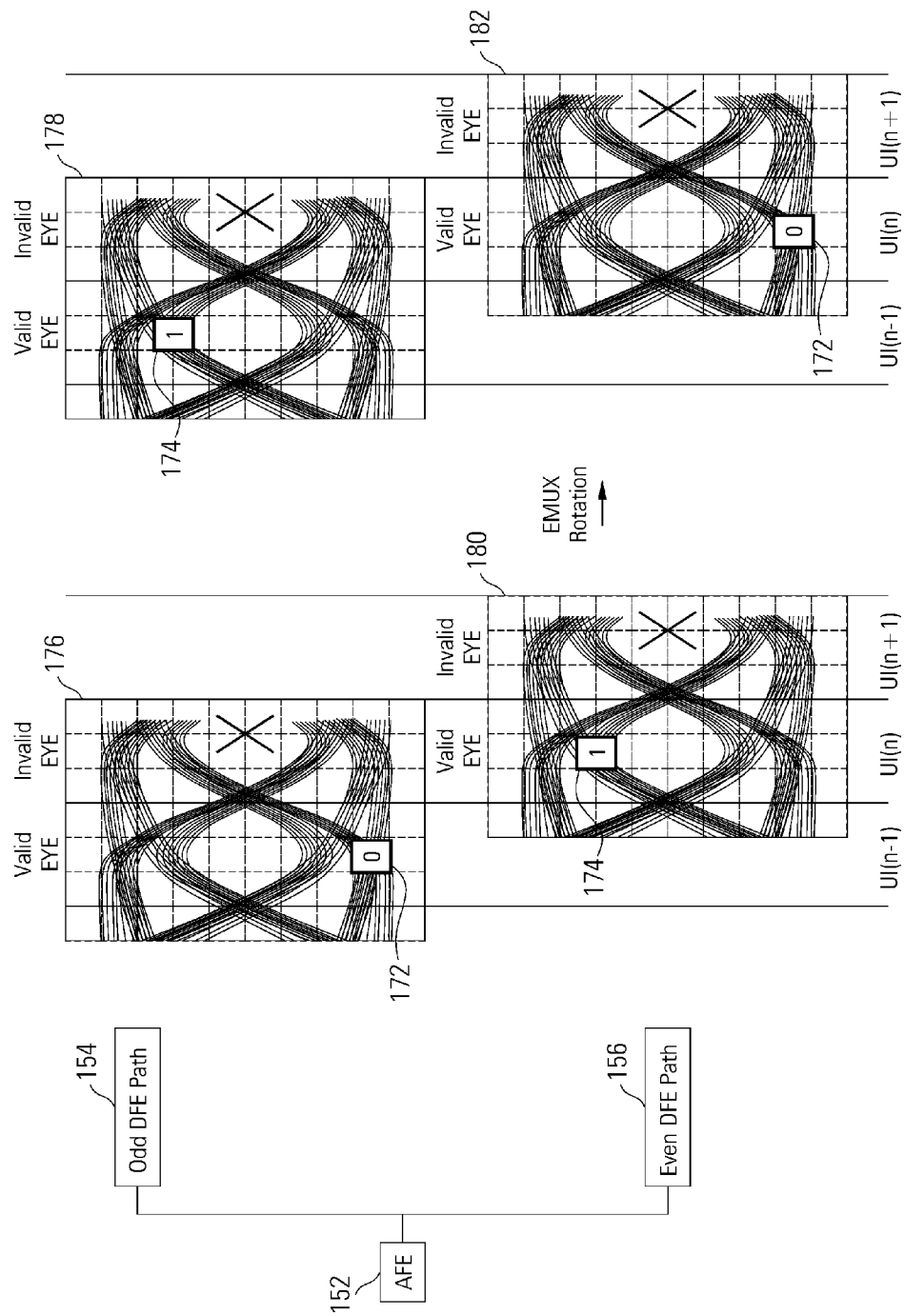
FIG. 7 depicts eye diagrams with decision levels for a pair of three-bit data patterns 001 and 010 in odd and even signal paths in a decision feedback equalizer in accordance with some embodiments of the present invention.

In some embodiments, the rotation of EMUX settings is carefully selected based on the channel and system characteristics to help average out eye mismatches and static pattern sensitivities that can arise using a single error latch to adapt one decision level per eye. In some cases, adaptation of EMUX settings for two decision levels is paired, with the decision levels to pair being selected to maximize information utilization. In some embodiments, adaptation of EMUX settings for decision levels dlev110 and dlev101 is paired as shown in FIG. 6, and adaptation of EMUX settings for decision levels dlev001 and dlev010 is paired as shown in FIG. 7.

In the pairing of FIG. 6, the dlev110 and dlev101 decision levels are adapted using EMUX settings 3 and 2, respectively, alternating the error latch between position 3 160 and position 2 162. Gradients dlev110Grad(n) and dlev101Grad(n) used to adapt dlev110 (e.g., 130) and dlev101 (e.g., 134) are calculated based on the outputs of the exyz error latch as follows:

$$dlev110Grad(n)=e110(n)*d(n)*EMUX(3)$$

$$dlev101Grad(n)=-e101(n)*d(n)*EMUX(2) \quad (Eq\ 3)$$

where EMUX(3) and EMUX(2) represent EMUX setting of 3 and 2 corresponding to data history, {d(n−1), d(n), d(n+1)=110} and {d(n−1), d(n), d(n+1)=101}, and where exyz(n) is the error latch value. Notably, the error latch value for EMUX setting 2 is inverted to yield the absolute value.

In operation, for example, the gradients used to adapt the decision levels dlev110 (e.g., 130) and dlev101 (e.g., 134) can be collected as follows. In the odd decision feedback equalizer path 154, the EMUX is configured to setting 3 (see eye diagram 164) to set the error latch to position 3 160 for the center bit in data pattern '110' and the corresponding gradient dlev110Grad(n) is updated based on the error latch output according to Equation 3. In the even decision feedback equalizer path 156, the EMUX is configured to setting 2 (see eye diagram 166) to set the error latch to position 2 162 for the center bit in data pattern '101' and the corresponding gradient dlev101Grad(n) is updated based on the error latch output according to Equation 3. The EMUX settings are then rotated. In the odd decision feedback equalizer path 154, the EMUX is configured to setting 2 (see eye diagram 168) to set the error latch to position 2 162 for the center bit in data pattern '101' and the corresponding gradient dlev101Grad(n) is updated based on the error latch output according to Equation 3. In the even decision feedback equalizer path 156, the EMUX is configured to setting 3 (see eye diagram 170) to set the error latch to position 3 160 for the center bit in data pattern '110' and the corresponding gradient dlev110Grad(n) is updated based on the error latch output according to Equation 3. Such rotation of EMUX settings can help to average out eye mismatches and static pattern sensitivities that can arise using a single error latch to adapt one decision level per eye.

Turning to FIG. 7, the example embodiment pairs adaptation of the dlev001 and dlev010 decision levels using EMUX settings 0 and 1, respectively, alternating the error latch between position 0 172 and position 1 174. Gradients dlev001Grad(n) and dlev010Grad(n) used to adapt dlev001 (e.g., 136) and dlev010 (e.g., 132) are calculated based on the outputs of the exyz error latch as follows:

$$dlev001Grad(n)=-e001(n)*d(n)*EMUX(0)$$

$$dlev010Grad(n)=e010(n)*d(n)*EMUX(1) \quad (Eq\ 4)$$

where EMUX(0) and EMUX(1) represent EMUX setting of 0 and 1 corresponding to data history, {d(n−1), d(n), d(n+1)=001} and {d(n−1), d(n), d(n+1)=010}, and where exyz(n) is the error latch value. Notably, the error latch value for EMUX setting 0 is inverted to yield the absolute value.

In operation, for example, the gradients used to adapt the decision levels dlev001 (e.g., 136) and dlev010 (e.g., 132) can be collected as follows. In the odd decision feedback equalizer path 154, the EMUX is configured to setting 0 (see eye diagram 176) to set the error latch to position 0 172 for the center bit in data pattern '001' and the corresponding gradient dlev001Grad(n) is updated based on the error latch output according to Equation 4. In the even decision feedback equalizer path 156, the EMUX is configured to setting 1 (see eye diagram 180) to set the error latch to position 1 174 for the center bit in data pattern '010' and the corresponding gradient dlev010Grad(n) is updated based on the error latch output according to Equation 4. The EMUX settings are then rotated. In the odd decision feedback equalizer path 154, the EMUX is configured to setting 1 (see eye diagram 178) to set the error latch to position 1 174 for the center bit in data pattern '010' and the corresponding gradient dlev010Grad(n) is updated based on the error latch output according to Equation 4. In the even decision feedback equalizer path 156, the EMUX is configured to setting 0 (see eye diagram 182) to set the error latch to position 0 172 for the center bit in data pattern '001' and the corresponding gradient dlev001Grad(n) is updated based on the error latch output according to Equation 4.

In some embodiments, the deserializer receiver operates in a symmetric mode which accelerates dlevXYZ adaptation at a pre-BCA (Back Channel Adaptation) stage by updating dlev110 with negative dlev001 and dlev010 with negative of dlev101 and vice versa. At post-BCA (back channel adaptation) all four dlevXYZ adaptations operate independently.

Figure 8:
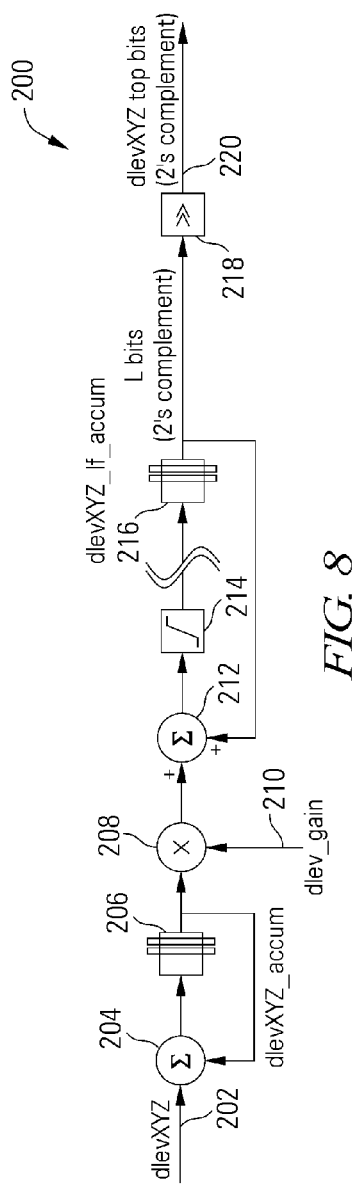
FIG. 8 depicts a block diagram of an example decision level dlevXYZ adaptation loop filter in accordance with some embodiments of the present invention.

Turning to FIG. 8, a block diagram of an example decision level dlevXYZ adaptation loop filter 200 is depicted in accordance with some embodiments of the present invention. The dlevXYZ gradient 202 is accumulated in a first accumulator 204, 206. The resulting accumulated decision level gradient dlevXYZ_accum is scaled in scaler 208 by an adaptation gain dlev_gain 210 which controls the adaptation rate. The scaled accumulated decision level gradient from scaler 208 is filtered and accumulated in a loop filter. The loop filter includes a low pass filter 214, L-bit binary loop filter accumulator 216 and combiner 212. The 2's complement M most significant bits from the loop filter 212, 214, 216 contain the M top bits of the adapted decision level dlevXYZ which are used to drive the error latch offset voltage.

Figure 9:
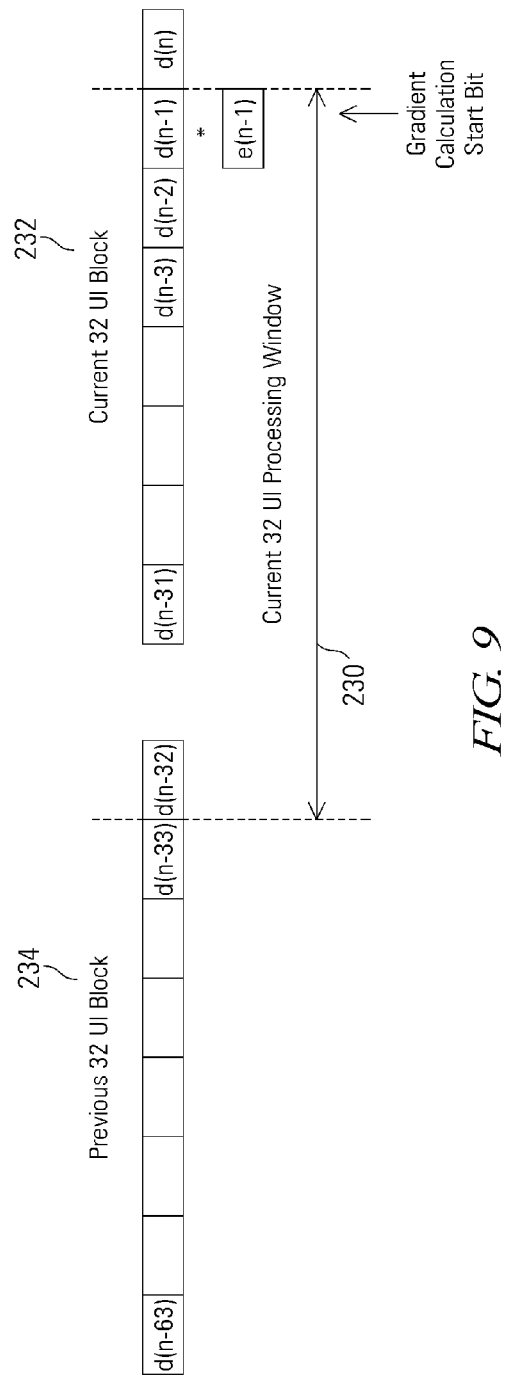
FIG. 9 depicts an example decision level dlevXYZ adaptation delay line in accordance with some embodiments of the present invention.

The decision level dlevXYZ adaptation loop filter 200 accumulates data over a window set by a delay line as shown in FIG. 9. In an example embodiment, the processing window 230 is 32 bit intervals long, although the deserializer receiver is not limited to this window length in the decision level adaptation loop filter. As dlevXYZ gradient 202 bits are received, the window 230 is shifted over the current bit interval block 232 and the previous bit interval block 234.

Figure 10:
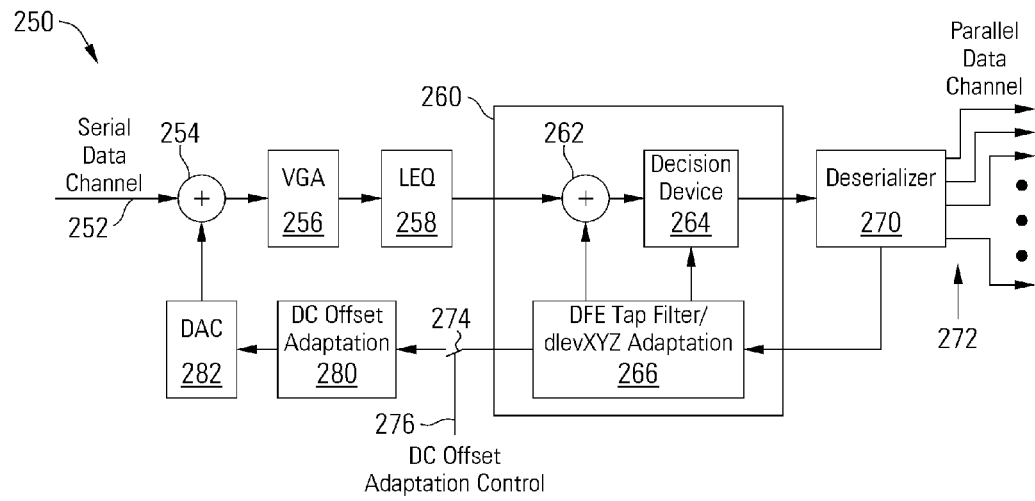
FIG. 10 depicts a block diagram of an example embodiment of a deserializer receiver which applies DC offset adaptation upstream from a linear equalizer based on adaptation of decision levels in a decision feedback equalizer in accordance with some embodiments of the present invention.

Turning to FIG. 10, a block diagram of a deserializer receiver 250 which applies DC offset adaptation upstream from a linear equalizer based on adaptation of decision levels in a decision feedback equalizer is depicted in accordance with some embodiments of the present invention. The deserializer receiver 250 receives an incoming analog signal from serial data channel 252, and applies DC offset compensation by combining a DC offset compensation feedback signal with the incoming signal from channel 212 in a combining circuit 254, also referred to herein as a DC offset cancellation circuit. The combining circuit 254 can be any suitable circuit for combining the DC offset compensation feedback signal with the incoming signal from channel 212, such as, but not limited to, an analog summing circuit. Based upon the disclosure herein, one of skill of the art will recognize a number of combining circuits that can be used to apply the DC offset compensation feedback signal in accordance with various embodiments of the invention.

The deserializer receiver 250 can also perform other signal enhancements before sampling the serial signal. Such enhancements include amplifying the DC offset-compensated signal from combining circuit 254 in variable gain amplifier (VGA) 256, and filtering the signal frequency range in continuous time linear equalizer (LEQ) 258 to compensate for frequency dependent degradation of the serial signal from channel 252 in channel media. The variable gain amplifier 256 and linear equalizer 258 are generally implemented in analog electronic circuitry, although not limited to this implementation.

The variable gain amplifier 256 and linear equalizer 258 have variable coefficients or parameters that can be controlled to adjust the gain and boost, respectively, applied to the serial signal from channel 252. The gain and boost are adapted to compensate (to the best of its ability depending on implementation) for frequency dependent distortions in channel 252. The variable gain amplifier 256 applies gain to the serial signal from channel 252 and linear equalizer 258 applies linear equalization to the gain adjusted serial signal. The effect of linear equalizer 258 may be a form of high pass filtering. In some cases, the variable gain amplifier 256 and linear equalizer 258 are coupled, with the gain in variable gain amplifier 256 and the boost in linear equalizer 258 being jointly adapted, for example based on a weighted least mean square gradient and a group delay gradient to achieve desired gain and boost settings for a target channel.

Because equalization in linear equalizer 258 does not necessarily compensate to a full extent for frequency dependent distortions of channel 252, additional equalization can be applied when needed to the serial signal in decision feedback equalizer (DFE) 260. The decision feedback equalizer 260 also samples the DC offset-corrected, gain adjusted and equalized signal. The decision feedback equalizer 260 includes decision device (e.g., slicer) 264, for example comprising two data latches and an error latch, that generates output decisions d(t) in the digital discrete timing domain corresponding to the input signal y(t). The decision feedback equalizer 260 also includes decision feedback equalizer tap filter and decision level dlevXYZ adaptation circuit 266 and combiner 262 that applies equalization to the signal from the linear equalizer 258 prior to slicing in a manner well known to one skilled in the art. The tap filter 266 uses feedback of decisions for detected symbols, filtered according to filter taps that can be adapted based on estimates of time-shifted pulse energy distortion contributions to a current, received symbol. Adaptation algorithms for filter taps for decision feedback equalizer tap filter 266 are well known to one skilled in the art.

The data samples produced by the decision device 264 in the decision feedback equalizer 260 are provided to a deserializer 270, which routes the detected data bits onto the parallel data bus 272. The data signal from deserializer 270 can also be provided to the decision feedback equalizer tap filter 266 to adapt the filter taps.

The decision feedback equalizer tap filter and decision level dlevXYZ adaptation circuit 266 also controls the adaptation process of decision levels dlevXYZ (e.g., 130, 132, 134, 136) and data latch threshold levels h1p', h1n' (e.g., 140, 142). The decision level dlevXYZ adaptation circuit 266 controls EMUX settings in embodiments which share an error latch for multiple decision levels dlevXYZ. The decision level dlevXYZ adaptation circuit 266 reads the output of the error latch and applies Equations 3 and 4 to calculate decision level gradients, and includes a decision level dlevXYZ adaptation loop filter such as that in FIG. 8 to drive the error latch offset voltage to adapt the decision levels dlevXYZ.

The decision level dlevXYZ adaptation circuit 266 also adapts the data latch threshold levels h1p', h1n' based on the decision levels dlevXYZ. In an embodiment which pairs dlev110 and dlev101 decision level adaptation as in FIG. 6 and which pairs dlev001 and dlev010 decision level adaptation as in FIG. 7, the decision level dlevXYZ adaptation circuit 266 calculates the top data latch position h1p':

$$h1p' = \frac{(dlev110 - dlev101)}{2} \quad \text{(Eq 5)}$$

which can include a DC offset x as shown in Equation 1. In this embodiment, the decision level dlevXYZ adaptation circuit 266 calculates the bottom data latch position h1n':

$$h1n' = \frac{(dlev001 - dlev010)}{2} \quad \text{(Eq 6)}$$

which can include a DC offset x as shown in Equation 1.

In some embodiments, the decision device 264 in the decision feedback equalizer 260 samples or slices the signal with a pair of data latches set based on the top and bottom data latch positions h1p' and h1n'.

The top and bottom data latch positions h1p' and h1n' from the decision level dlevXYZ adaptation circuit 266 are also provided to a DC offset adaptation circuit 280, which calculates a DC offset compensation value according to Equation 2. The decision level dlevXYZ adaptation circuit 266 and the DC offset adaptation circuit 280 thus adapt the top and bottom data latch positions h1p' and h1n' or DFE taps, and calculate the DC offset by taking half the sum of the two DFE h1 levels.

In some embodiments in which one or more error latches are shared in a time multiplexed manner, a coarse adaptation scheme can be employed at startup, wherein which one of the data latch positions is first obtained and copied as the starting position for the other data latch. For example, the dlev001 and dlev010 decision levels using EMUX settings 0 and 1 are adapted to obtain h1n' (or −h1), which is copied to h1p' (or +h1) if it has not yet been adapted.

Subsequently, during a fine adaptation phase each of the top and bottom data latch positions h1p' and h1n' or DFE taps are adapted independently.

The digital DC offset compensation value is passed from the DC offset adaptation circuit 280 to a digital to analog converter (DAC) 282, which yields an analog DC offset compensation value to be combined with the input signal in combining circuit 254. As the DC offset compensation is applied in combining circuit 254, the DC offset x will approach 0, h1p' will approach h1p and h1n' will approach h1n.

The deserializer DC offset adaptation applied in the deserializer receiver 250 of FIG. 10 is performed in open-loop fashion, initially adapting the DC offset compensation value and then discontinuing adaptation of the DC offset compensation value during normal operation of the deserializer. In some embodiments, a switch 274 is included upstream from the DC offset adaptation circuit 280. When closed during the initial DC offset compensation adaptation period, the switch 274 passes the top and bottom data latch positions h1p' and h1n' from the decision level dlevXYZ adaptation circuit 266 to the DC offset adaptation circuit 280. After the DC offset compensation adaptation period, the switch 274 is opened to discontinue adaptation of the DC offset compensation value, thereby disabling the DC offset adaptation circuit 280 after the DC offset is calculated. The adapted DC offset compensation value continues to be applied by combination circuit 254 after adaptation is discontinued.

The deserializer DC offset adaptation disclosed herein thus adapts a DC offset compensation value based on independent adaptation of decision levels in a decision feedback equalizer. If there is a DC offset in the data eye, both top and bottom DFE taps will be elevated up or down from their ideal voltage position. From the adapted data latch positions h1p', h1n' (or DFE h1 tap pair), the DC offset is calculated in a block adaptation process as described above. The adapted DC offset is passed back in the feedback loop to be applied to the input signal upstream from continuous time linear equalizer 258 and variable gain amplifier 256 after digital to analog conversion. In this embodiment, the full DC offset is corrected, including any DC offset introduced by DFE summers, buffers, the linear equalizer 258, etc. Digital adaptation applied in this embodiment is more process invariant and more reliable than purely analog alternatives. Furthermore, the adaptation loop is shared for regular decision feedback equalizer adaptation, and the resulting adapted DFE taps are exploited to derive DC offset information.

Figure 11:
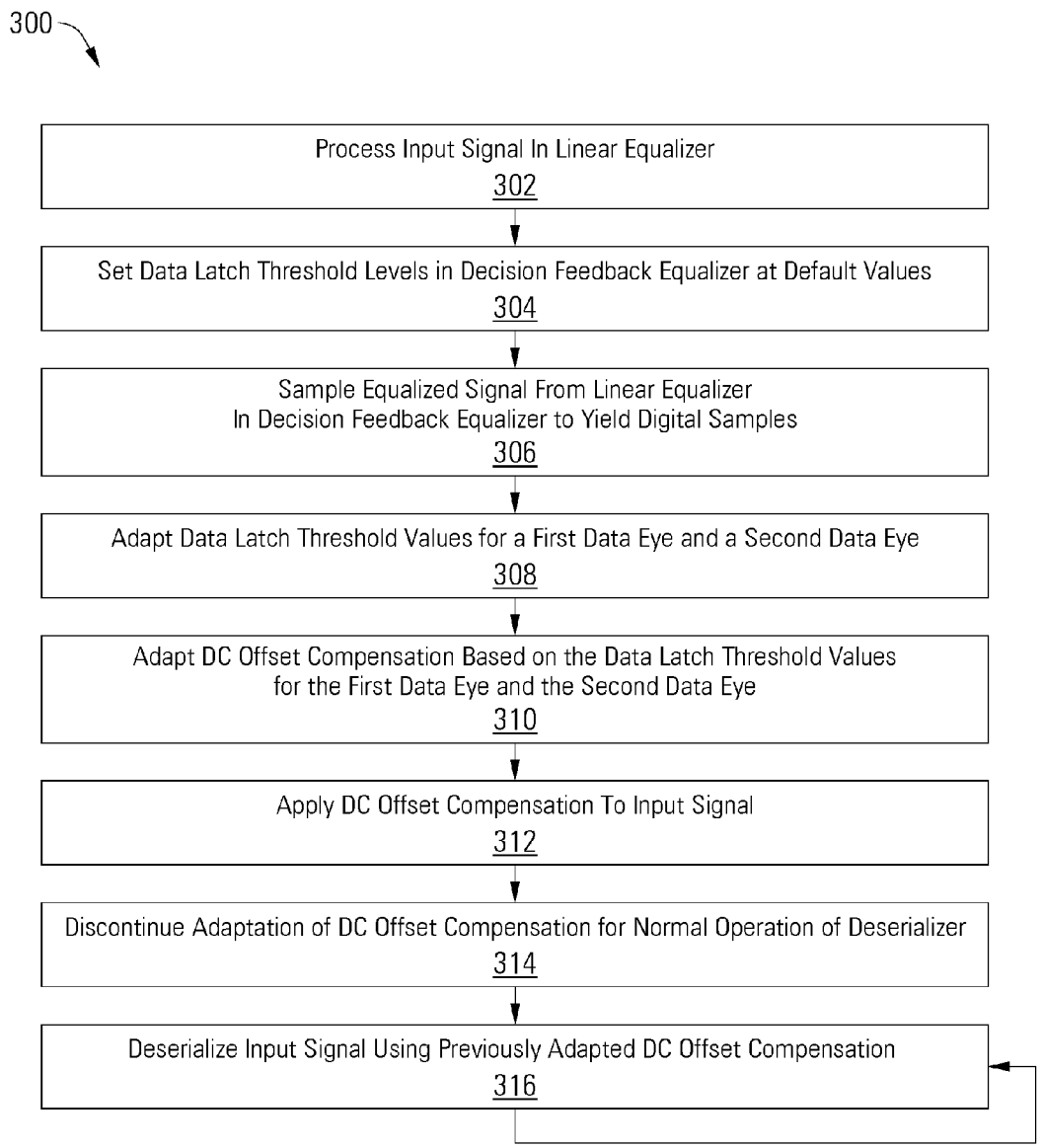
FIG. 11 is a flow diagram of an operation to adapt DC offset compensation in a deserializer receiver based on independent adaptation of multiple data latch threshold levels in a decision feedback equalizer in the deserializer receiver in accordance with some embodiments of the present invention, where the DC offset compensation is applied upstream from a linear equalizer.

Turning to FIG. 11, flow diagram 300 depicts an operation to adapt DC offset compensation in a deserializer receiver based on independent adaptation of multiple data latch threshold levels in a decision feedback equalizer in the deserializer receiver in accordance with some embodiments of the present invention. In this embodiment, the DC offset compensation is applied upstream from a linear equalizer. Following flow diagram 300, an input signal is processed in a linear equalizer. (Block 302) In some embodiments, the input signal comprises an analog signal representing a serial data stream, for example read from a storage device such as a hard disk drive or a flash memory device, or received from a transmitter in a wireless communication system. In some embodiments, the linear equalizer comprises a continuous linear equalizer that applies a frequency-dependent boost to the signal to compensate for channel loss. Data latch threshold levels in a decision feedback equalizer are set at default values. (Block 304) The equalized signal from the linear equalizer is sampled in the decision feedback equalizer to yield digital samples. (Block 306) The data latch threshold values are adapted for a first data eye and a second data eye. (Block 308) In some embodiments, the first data eye is defined by dlev110 and dlev101 decision thresholds for '110' and '101' data patterns, with the data latch threshold value for the first data eye being half the sum of the dlev110 and dlev101 decision thresholds. The second data eye is defined by dlev001 and dlev010 decision thresholds for '001' and '010' data patterns, with the data latch threshold value for the second data eye being half the sum of the dlev001 and dlev010 decision thresholds. The DC offset compensation value is adapted based on the data latch threshold values for the first data eye and the second data eye. (Block 310) The DC offset compensation is applied to the input signal. (Block 312) In some embodiments, the DC offset compensation is applied upstream from a linear equalizer in the analog domain, with the DC offset compensation value being converted from a calculated digital value to an analog value by a digital to analog converter. Adaptation of the DC offset compensation is discontinued after initial adaptation to allow normal operation of the deserializer. (Block 314) Thus, in some embodiments, the DC offset compensation adaptation is performed in open-loop fashion. The input signal is then deserialized using the previously adapted DC offset compensation.

Figure 12:
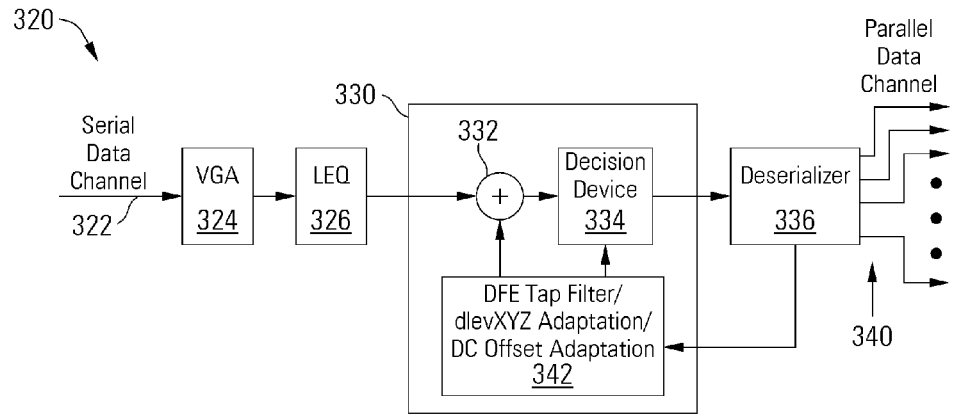
FIG. 12 depicts a block diagram of an example embodiment of a deserializer receiver which applies DC offset adaptation in a decision feedback equalizer based on adaptation of decision levels in the decision feedback equalizer in accordance with some embodiments of the present invention.

Turning to FIG. 12, a block diagram of a deserializer receiver 320 which applies DC offset adaptation in a decision feedback equalizer based on adaptation of decision levels in the decision feedback equalizer is depicted in accordance with some embodiments of the present invention. The deserializer receiver 320 receives an incoming analog signal from serial data channel 322, amplifies the incoming analog signal in variable gain amplifier (VGA) 324, and filters the signal frequency range in continuous time linear equalizer (LEQ) 326 to compensate for frequency dependent degradation of the serial signal from channel 322 in channel media. The variable gain amplifier 324 and linear equalizer 326 are generally implemented in analog electronic circuitry, although not limited to this implementation.

Because equalization in linear equalizer 326 does not necessarily compensate to a full extent for frequency dependent distortions of channel 322, additional equalization can be applied when needed to the serial signal in decision feedback equalizer (DFE) 330. The decision feedback equalizer 330 also samples the gain adjusted and equalized signal while applying DC offset compensation by adjusting the position or level of the data latch thresholds in the decision feedback equalizer 330 used to sample the data. The decision feedback equalizer 330 includes decision device (e.g., slicer) 334, for example comprising two data latches and an error latch, that generates output decisions d(t) in the digital discrete timing domain corresponding to the input signal y(t). The decision feedback equalizer 330 also includes decision feedback equalizer tap filter and decision level dlevXYZ adaptation circuit and DC offset adaptation circuit 342 and combiner 332 that applies equalization to the signal from the linear equalizer 326 prior to slicing in a manner well known to one skilled in the art. The tap filter 342 uses feedback of decisions for detected symbols, filtered according to filter taps that can be adapted based on estimates of time-shifted pulse energy distortion contributions to a current, received symbol. Adaptation algorithms for filter taps for decision feedback equalizer tap filter 342 are well known to one skilled in the art.

The data samples produced by the decision device 334 in the decision feedback equalizer 330 are provided to a deserializer 336, which routes the detected data bits onto the parallel data bus 340. The data signal from deserializer 336 can also be provided to the decision feedback equalizer tap filter 342 to adapt the filter taps.

The decision feedback equalizer tap filter and decision level dlevXYZ adaptation circuit and DC offset adaptation circuit 342 also controls the adaptation process of decision levels dlevXYZ (e.g., 130, 132, 134, 136) and data latch threshold levels h1p', h1n' (e.g., 140, 142). The decision level dlevXYZ adaptation circuit 342 controls EMUX settings in embodiments which share an error latch for multiple decision levels dlevXYZ. The decision level dlevXYZ adaptation circuit 342 reads the output of the error latch and applies Equations 3 and 4 to calculate decision level gradients, and includes a decision level dlevXYZ adaptation loop filter such as that in FIG. 8 to drive the error latch offset voltage to adapt the decision levels dlevXYZ.

The decision level dlevXYZ adaptation circuit 342 also adapts the data latch threshold levels h1p', h1n' based on the decision levels dlevXYZ. In an embodiment which pairs dlev110 and dlev101 decision level adaptation as in FIG. 6 and which pairs dlev001 and dlev010 decision level adaptation as in FIG. 7, the decision level dlevXYZ adaptation circuit 342 calculates the top data latch position h1p' according to Equations 5 and 6.

Furthermore, the decision level dlevXYZ adaptation circuit and DC offset adaptation circuit 342 also applies a shift or offset in the data latch threshold levels h1p', h1n' to reverse or cancel the detected DC offset in the signal, thereby subtracting the DC offset x from data latch threshold levels h1p', h1n' to yield corrected data latch threshold levels h1p, h1n to be used in the data latches of decision device 334. In comparison with the first embodiment depicted in FIG. 10, in which the DC offset x is removed from the analog input signal so that the signal at the decision device 264 is corrected and data latch threshold levels h1p', h1n' substantially equal levels h1p, h1n, in the embodiment of FIG. 12, the DC offset x remains in the signal at the decision device 334 but the positions of the data latch thresholds h1p', h1n' are shifted to take into account the DC offset x.

The deserializer DC offset adaptation applied in the deserializer receiver 320 of FIG. 12 is performed in closed-loop fashion in some embodiments, with the DC offset x continually being calculated and the positions of the data latch thresholds h1p', h1n' being adapted over time. In some other embodiments, the deserializer receiver 320 of FIG. 12 can be performed in closed-loop fashion with the DC offset x being calculated once or periodically updated to adapt the positions of the data latch thresholds h1p', h1n'.

Figure 13:
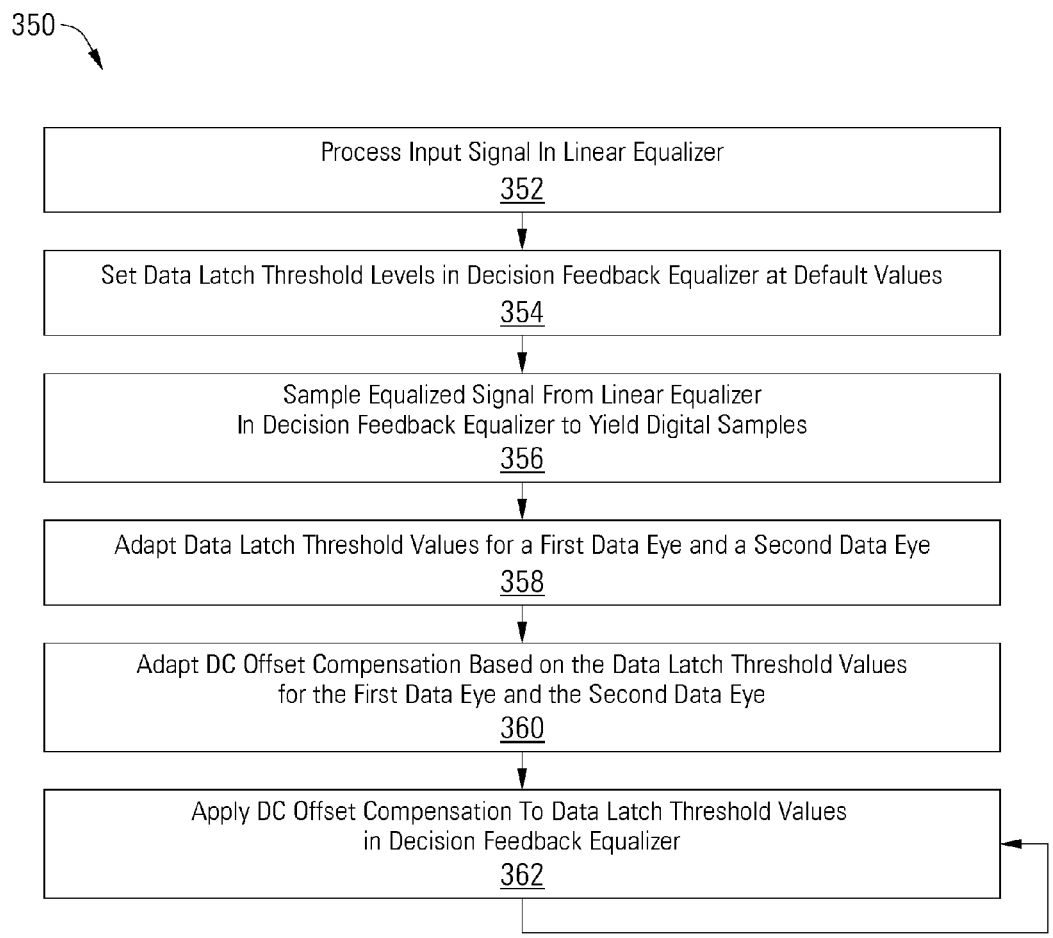
FIG. 13 is a flow diagram of an operation to adapt DC offset compensation in a deserializer receiver based on independent adaptation of multiple data latch threshold levels in a decision feedback equalizer in the deserializer receiver in accordance with some embodiments of the present invention, where the DC offset compensation is applied in the decision feedback equalizer.

Turning to FIG. 13, flow diagram 350 depicts an operation to adapt DC offset compensation in a deserializer receiver based on independent adaptation of multiple data latch threshold levels in a decision feedback equalizer in the deserializer receiver in accordance with some embodiments of the present invention. In this embodiment, the DC offset compensation is applied in the decision feedback equalizer. Following flow diagram 350, an input signal is processed in a linear equalizer. (Block 352) In some embodiments, the input signal comprises an analog signal representing a serial data stream, for example read from a storage device such as a hard disk drive or a flash memory device, or received from a transmitter in a wireless communication system. In some embodiments, the linear equalizer comprises a continuous linear equalizer that applies a frequency-dependent boost to the signal to compensate for channel loss. Data latch threshold levels in a decision feedback equalizer are set at default values. (Block 354) The equalized signal from the linear equalizer is sampled in the decision feedback equalizer to yield digital samples. (Block 356) The data latch threshold values are adapted for a first data eye and a second data eye. (Block 358) In some embodiments, the first data eye is defined by dlev110 and dlev101 decision thresholds for '110' and '101' data patterns, with the data latch threshold value for the first data eye being half the sum of the dlev110 and dlev101 decision thresholds. The second data eye is defined by dlev001 and dlev010 decision thresholds for '001' and '010' data patterns, with the data latch threshold value for the second data eye being half the sum of the dlev001 and dlev010 decision thresholds. The DC offset compensation value is adapted based on the data latch threshold values for the first data eye and the second data eye. (Block 360) The DC offset compensation is applied to the data latch threshold values in the decision feedback equalizer. (Block 362)

The DC offset adaptation disclosed herein allows a serializer/deserializer receiver to compensate for DC offset in the input signal and/or introduced in the deserializer. DC offset compensation is adapted in various embodiments by adapting the top and bottom decision feedback equalizer first post cursor independent of each other to retain the receiver margin. Such a decision feedback equalizer first post cursor asymmetric correction-based DC offset system guarantees continuous receiver margin retention. In some embodiments, half the sum of the top and bottom decision feedback equalizer data eyes is fed back to the analog front end so that the input signal is balanced along the analog path. A follow-up DC offset feedback loop makes the signal DC-balanced so that signal linearity is maintained along the analog data path. In some other embodiments, data latch thresholds h1p', h1n' are continuously adapted based on the adapted DC offset compensation values.

Serializer/deserializer technology, and in particular the deserializer DC offset compensation disclosed herein, is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some cases, parts of a given system, block or circuit may be implemented in software or firmware, while other parts are implemented in hardware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

In conclusion, embodiments of the present invention provide novel systems, devices, methods and arrangements for deserializer DC offset compensation which is adapted by adapting the top and bottom decision feedback equalizer data latch thresholds independent of each other. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. An apparatus for processing data, comprising:
a decision feedback equalizer configured to sample an analog signal to yield digital data, wherein the decision feedback equalizer samples the analog signal with at least one data latch configured at a first data latch threshold value and at a second data latch threshold value; and
a DC offset adaptation circuit configured to calculate a DC offset in the analog signal based on the first data latch threshold value and on the second data latch threshold value, wherein the DC offset adaptation circuit is configured to calculate the DC offset as half a sum of the first data latch threshold value and the second data latch threshold value.

2. The apparatus of claim 1, further comprising a DC offset cancellation circuit configured to remove the DC offset from the analog signal.

3. The apparatus of claim 2, further comprising a continuous time linear equalizer configured to equalize the analog signal to yield an equalized signal to be sampled by the decision feedback equalizer.

4. The apparatus of claim 3, wherein the DC offset cancellation is upstream from the continuous time linear equalizer.

5. The apparatus of claim 2, further comprising a digital to analog converter configured to convert the DC offset from a digital value to an analog value before removing the DC offset from the analog signal.

6. The apparatus of claim 2, wherein the DC offset adaptation circuit is disabled after calculating the DC offset.

7. The apparatus of claim 1, wherein the decision feedback equalizer is configured to shift the first data latch threshold value and the second data latch threshold value based on the DC offset calculated by the DC offset adaptation circuit.

8. The apparatus of claim 7, wherein the DC offset is substantially removed from the digital data by shifting the first data latch threshold value and the second data latch threshold value in the decision feedback equalizer based on the DC offset calculated by the DC offset adaptation circuit.

9. The apparatus of claim 1, wherein the at least one data latch comprises a first data latch configured to sample the analog signal using the first data latch threshold value and a second data latch configured to sample the equalized signal using the second data latch threshold value.

10. The apparatus of claim 1, further comprising a decision level adaptation circuit configured to adapt a plurality of error latch threshold values, each based on a different data pattern in the digital data.

11. The apparatus of claim 10, wherein the plurality of error latch threshold values comprises a first error latch threshold value, a second error latch threshold value, a third error latch threshold value and a fourth error latch threshold value, and wherein the decision level adaptation circuit is configured to adapt the first data latch threshold value based on the first error latch threshold value and the second error latch threshold value, and to adapt the second data latch threshold value based on the third error latch threshold value and the fourth error latch threshold value.

12. The apparatus of claim 11, wherein the decision level adaptation circuit is configured to calculate the first data latch threshold value as half a sum of the first error latch threshold value and the second error latch threshold value, and to calculate the second data latch threshold value as half a sum of the third error latch threshold value and the fourth error latch threshold value.

13. The apparatus of claim 11, wherein the decision level adaptation circuit is configured to adapt the first error latch threshold value based on a level of the analog signal for a data pattern of '110' in the digital data, to adapt the second error latch threshold value based on a level of the analog signal for a data pattern of '101' in the digital data, to adapt the third error latch threshold value based on a level of the analog signal for a data pattern of '001' in the digital data, and to adapt the fourth error latch threshold value based on a level of the analog signal for a data pattern of '010' in the digital data.

14. The apparatus of claim 1, wherein the apparatus comprises a serializer/deserializer receiver.

15. A method for deserializing data, comprising:
sampling an analog signal at a first data latch threshold value and at a second data latch threshold value in a decision feedback equalizer circuit to yield digital data, wherein the first data latch threshold value is calculated based on levels of the analog signal for first and second patterns in the digital data, and wherein the second data latch threshold value is calculated based on levels of the analog signal for third and fourth patterns in the digital data; and
calculating a DC offset in the analog signal based on half a sum of the first data latch threshold value and the second data latch threshold value.

16. The method of claim 15, further comprising converting the DC offset to an analog value and subtracting the analog value of the DC offset from the analog signal upstream from the decision feedback equalizer circuit.

17. The method of claim 16, wherein the DC offset is calculated in open-loop fashion.

18. The method of claim 15, further comprising shifting the first data latch threshold value and the second data latch threshold value in the decision feedback equalizer circuit based on the DC offset to remove the DC offset from the digital data.

19. A deserializer receiver comprising:
decision feedback equalizer means for sampling an analog signal to yield digital data, wherein the decision feedback equalizer samples the analog signal with at least one data latch configured at a first data latch threshold value and at a second data latch threshold value; and
DC offset adaptation means for calculating a DC offset in the analog signal based on the first data latch threshold value and on the second data latch threshold value, wherein a first data latch is configured to sample the analog signal using the first data latch threshold value and a second data latch is configured to sample the analog signal using the second data latch threshold value.

20. The deserializer receiver of claim 19, wherein the DC offset adaptation means is configured to calculate the DC offset as half a sum of the first data latch threshold value and the second data latch threshold value.

* * * * *